United States Patent [19]

Mobley et al.

[11] Patent Number: 4,734,455

[45] Date of Patent: Mar. 29, 1988

[54] STABILIZERS FOR FILLED POLYOL COMPOSITIONS

[75] Inventors: Larry W. Mobley, Cohutta; James K. Jennings, Rocky Face, both of Ga.; Robert B. Turner, Lake Jackson, Tex.

[73] Assignee: The Dow Chemical Company, Midland, Mich.

[21] Appl. No.: 938,223

[22] Filed: Dec. 5, 1986

[51] Int. Cl.$^4$ .......................... C08K 5/09; C08K 3/32
[52] U.S. Cl. ..................................... 524/710; 524/711; 524/713; 524/728; 524/773; 524/779; 524/780; 524/783; 524/785; 524/786
[58] Field of Search ............... 524/728, 706, 713, 710, 524/711, 773, 779, 780, 783, 785, 786

[56] References Cited

U.S. PATENT DOCUMENTS

| | | | |
|---|---|---|---|
| 4,207,227 | 6/1980 | Bonin | 524/871 |
| 4,240,950 | 12/1980 | Bonin et al. | 524/871 |
| 4,328,041 | 5/1982 | Wilson | 106/308 |
| 4,585,803 | 4/1986 | Nelson et al. | 521/105 |

FOREIGN PATENT DOCUMENTS

| | | |
|---|---|---|
| 119471 | 9/1984 | European Pat. Off. . |
| 56-104927 | 8/1981 | Japan .................................. 524/706 |
| 56-106915 | 8/1981 | Japan . |

*Primary Examiner*—Lewis T. Jacobs

[57] ABSTRACT

This invention is an active hydrogen-containing composition comprising a relatively high equivalent weight active hydrogen-containing material and an inert, particulate filler which is stabilized with a stabilizer composition comprising (1) a carboxylic or phosphorus-containing acid containing about 8 to about 30 carbon atoms and (2) a metal salt of a carboxylic acid containing about 8 to about 30 carbon atoms.

The stabilizer composition substantially reduces the tendency of the filler to settle out of the relatively high equivalent weight active hydrogen-containing compound, while having minimal impact on the reactivity of the active hydrogen-containing composition with a polyisocyanate and on the physical properties of the resultant polyurethane.

16 Claims, No Drawings

STABILIZERS FOR FILLED POLYOL COMPOSITIONS

BACKGROUND OF THE INVENTION

This invention relates to a polyol composition containing a particulate filler, more particularly to a stable dispersion of a particulate filler in a polyol, as well as to a polyurethane prepared therefrom.

It is often desirable to "fill" polymeric material with an inert filler. In many instances, the filler provides desirable physical properties or simply reduces the overall cost of the polymeric article. Polyurethanes, like other polymers, are often filled for these and other purposes. In particular, polyurethane coatings and polyurethane carpet backings are often filled.

Typically, the filler is incorporated into a melt of the polymer, and is easily kept homogeneously dispersed therein by solidfying the polymer. The solid state of the polymer keeps the filler from settling out. Unlike most other polymers, however, polyurethane polymers usually are polymerized and shaped or molded at the same time. Accordingly, the filler is typically incorporated in the polyurethane by blending it into one or more of the precursor materials. Most often, the filler is blended with the active hydrogen-containing materials.

Unfortunately, the fillers are often not easily and stably dispersable in the polyether polyols most often used in making polyurethanes. This is particularly true when the polyether polyol contains a significant proportion of repeating oxyethylene units. Commonly used fillers such as alumina trihydrate, barium sulfate and calcium carbonate tend to settle out of these polyether polyols during handling. This causes a myriad of problems, such as clogged lines, precipitate cakes in storage tanks, and inconsistent composition of the polyol mixture. This last problem is particularly bothersome, since the stoichiometry of the reaction between the polyol mixture and the polyisocyanate will change as the composition is consumed. This leads to undercured or overcured products having undesirable properties.

With many polymer dispersions, such as latexes, the filler can be dispersed and stabilized therein with the use of a thickener. However, since the polyol is of substantial viscosity to begin with, the use of these thickeners tends to make the compositions too viscous to handle easily.

The problem of filler suspension instability is of particular concern in making polyurethane-backed carpet, especially unitary carpet backing. The polyurethane used in this application contains a high level of fillers. In addition, due to the exacting performance specifications, the composition of the polyol mixture must be the same, within very low tolerances, during the course of a run. As a result, it has become very important to provide improved stability to polyol mixtures containing particulate fillers.

Titanate compounds and silane coupling agents are known to be useful in stabilizing particulate fillers in organic polymers. However, their use in polyurethanes has at least one substantial disadvantage. In coupling with the filler particles, these agents form a monoalcohol. This alcohol reacts with a polyisocyanate to form an end to the growing polymer chain. Accordingly, it causes the average molecular weight of the polyurethane to be substantially reduced, which in turn causes inferior physical properties.

Fatty acids are also known as dispersing agents for particulate fillers. However, these materials greatly reduce the reactivity of the polyurethane precursor, making them unsuitable for use in polyurethanes.

Accordingly, it would be desirable to provide a dispersion of a particulate filler in a polyether polyol which has improved stability, i.e., in which the filler particles have improved resistance to precipitation.

SUMMARY OF THE INVENTION

In one aspect, this invention is an active hydrogen-containing composition comprising
(a) a relatively high equivalent weight active hydrogen-containing material,
(b) at least about 5 parts by weight of an inert, particulate filler per 100 parts by weight of component (a), and
(c) a stabilizing amount of a stabilizer composition comprising
  (1) a carboxylic or phosphorus-containing acid containing about 8 to about 30 carbon atoms and
  (2) a metal salt of a carboxylic acid containing about 8 to about 30 carbon atoms.

In another aspect, the invention is a filled polyurethane which is the reaction product of a reaction mixture comprising a polyisocyanate and the active hydrogen-containing composition of this invention.

It has been found that by employing a mixture of a $C_8$–$C_{30}$ carboxylic or phosphorus-containing acid and a salt of a similar carboxylic or phosphorus-containing acid, excellent stability of the particulate filler is obtained. In addition, the use of the stabilizer composition of this invention does not cause significant changes in the physical properties of the resultant polyurethane, or the reactivity of the components.

DETAILED DESCRIPTION OF THE INVENTION

One component of the active hydrogen-containing composition of this invention is a relatively high equivalent weight active hydrogen-containing compound. This compound advantageously has an equivalent weight from about 500 to about 5,000, preferably about 800 to about 3000, and more preferably about 1000 to about 2500. It also contains a plurality of groups which contain one or more hydrogen atoms which are reactive with an isocyanate group. Such groups include hydroxyls, primary or secondary amines, mercaptans, and the like, with hydroxyl- and amine-containing compounds being preferred and hydroxyl-containing compounds being most preferred. Preferably, the relatively high equivalent weight active hydrogen-containing compound contains about 2 to about 4, more preferably about 2 to about 3, such active hydrogen-contining groups per molecule. Suitable relatively high equivalent weight active hydrogen-containing compounds are described, for example, in U.S. Pat. No. 4,581,418, incorporated herein by reference.

Preferred relatively high equivalent weight active hydrogen-containing compounds include polyester polyols and especially polyether polyols. Such compounds are described in U.S. Pat. No. 4,581,418. A more preferred relatively high equivalent weight active hydrogen-containing compound is a polyether polyol which is a polymer of a $C_3$–$C_6$ cyclic ether which is end-capped with ethylene oxide to provide terminal primary hydroxyl groups. The most preferred relatively high equivalent weight active hydrogen-containing compound is a di- or trifunctional polymer of propylene oxide containing about 10 to about 25 weight -% terminal ethylene oxide capping, and having an equivalent weight from about 1000 to about 2500. The ethylene oxide-capped polyethers are preferred for their superior processing characteristics, and because they are particularly incompatible with the fillers and therefore benefit most from this invention.

An inert particulate filler material is dispersed in the relatively high equivalent weight active hydrogen-containing compound. By "inert", it is meant that the filler material does not undesirably react with the components present in the active hydrogen-containing composition, or the polyisocyanate, and does not undesirably interfere with the reaction of the active hydrogen-containing components and the polyisocyanate. Suitable such fillers include alumina trihydrate, calcium carbonate, titanium dioxide, burium sulfate, lead oxide, clays such as kaolin, $Sb_2O_3$, talc, $Mg(OH)_2.5H_2O$, fly ash and the like. Preferred are alumina trihydrate, calcium carbonate and mixtures thereof.

At least about 5 parts by weight of the filler are present per 100 parts by weight of the relatively high equivalent weight active hydrogen-containing compound. Preferably about 10 to about 250, more preferably about 20 to about 200, most preferably aobut 40 to about 200, parts of the filler are present per 100 parts of the relatively high equivalent weight active hydrogen-containing compound. However, it is apparent that the most desirable level of filler will depend on the properties required by any particular use of the polyurethane. It is well within the ordinary skill in the art to select a most beneficial level of filler to meet the needs of such particular application.

A stabilizer composition is used in this invention to aid in dispersing the filler in the relatively high equivalent weight active hydrogen-containing compound. This stabilizer comprises two components. This first is a carboxylic or phosphorus-containing acid having from about 8 to about 30 carbon atoms. The second is a metal salt of such an acid.

Suitable carboxylic acids include saturated or unsaturated aliphatic or cycloaliphatic acids or aromatic carboxylic acids. Of these, the aliphatic acids are preferred. Included among these acids are the so-called "fatty" acids having from about 10 to about 22 carbon atoms, including, for example, oleic acid, stearic acid, aluric acid, palmitic acid, linoleic acid, ricinoleic acid and the like, as well as mixtures thereof.

Other suitable carboxylic acids include the amido-containing carboxylic acids such as the reaction products of carboxylic acid halides containing from about 1 to about 24 carbon atoms with an amino carboxylic acid having from about 2 to about 4, preferably 2 to about 3 carbon atoms per molecule. Particularly suitable among such amido-containing carboxylic acids are those represented by the general formula

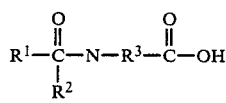

wherein $R^1$ is a hydrocarbon or substituted hydrocarbon group having from about 1 to about 23 carbon atoms, $R^2$ is hydrogen, an alkyl or hydroxyl-substituted alkyl group having from about 1 to about 3 carbon atoms, and $R^3$ is a divalent hydrocarbon group having from about 1 to about 3, preferably about 1 carbon atom. Examples of such amido-containing carboxylic acids include, for example oleoyl sarcosine, lauryl sarcosine, capryl sarcosine, oleoyl glycine, octanol glycine, oleoyl hydroxyethyl glycine, mixtures thereof and the like. These amido-containing carboxylic acids can be prepared by the Schotten-Baumann acylation reaction wherein an acyl halide is reacted with an amino acid.

Suitable organic materials containing at least one phosphorus-containing acid group include, for example, monostearyl acid phosphate, cetyl dihydrogen phosphate, monolauryl phosphate, decyl dihydrogen phosphate, monobutyl monodecyl ester of phosphoric acid, mixtures thereof and the like.

The second component of the stabilizer composition is a metal salt of one of the aforementioned acids. In such salt the metal ion is preferably selected from Groups I, IA, II, or IIA of the Periodic Table of the Elements, aluminum, chromium, molybdenum, iron, cobalt, nickel, tin, lead, antimony or bismuth. Preferred metals are the alkali metals, especially sodium and potassium, the alkaline earth metals, zinc, cadmium, aluminum, iron, cobalt or nickel. Most preferred are sodium, potassium, zinc, calcium, magnesium and nickel.

Particularly suitable metal acid salts include, for example, the zinc, sodium, potassium, calcium, magnesium and nickel salts of palmitic acid, stearic acid, lauric acid, ricinoleic acid, linoleic acid, linolenic acid, oleoyl sarcosine, lauryl sarcosine, capryl sarcosine, oleoyl glycine, octanol glycine, oleoyl hydroxyethyl glycine and the like.

It is preferred that the acid and the acid portion of the acid salt be similar in composition. Accordingly, it is preferred that the acid and the acid salt contain approximately the same number of carbon atoms and have similar internal structures such as unsaturation, amide linkages, and the like. Accordingly, it is within the scope of this invention to employ as the stabilizer composition an acid which is only particularly reacted or complexed with a metal ion. Such partially reacted or complexed acid will comprise a mixture of both the free acid and the metal salt thereof.

The relative proportions of the acid and the metal salt are chosen such that the stabilizer composition as a whole exhibits minimal effect on the reactivity of the active hydrogen-containing compounds and the polyisocyanate. This is advantageously accomplished by employing a stabilizer composition comprising about 20 to about 80 weight percent of the acid and about 80 about 20 weight percent of the metal salt, based on the combined weight thereof. Preferably the stabilizer composition comprises about 30 to about 70 weight percent of the acid and 70 to about 30 percent of the metal salt.

The stabilizer is used in a stabilizing amount, i.e., an amount sufficient to reduce the tendency of the filler to settle out of the relatively high equivalent weight active hydrogen-containing compound compared to a similar system which does not contain the stabilizer. Advantageously, about 0.05 to about 5, preferably about 0.1 to about 3, more preferably about 0.2 to about 2 parts by weight of the stabilizer composition are used per 100 parts of the relatively high equivalent weight active hydrogen-containing compound. Of course, the optimal amount of stabilizer composition used will depend somewhat on the amount of fillers used, with larger levels of fillers requiring relatively large quantities of stabilizer. However, the levels of stabilizer mentioned above are generally adequate to stabilize up to about 250 parts by weight of filler per 100 parts relatively high equivalent weight active hydrogen-containing compound.

In preparing the active hydrogen-containing composition of this invention, it is preferred to mix the relatively high equivalent weight active hydrogen-containing compound with the stabilizer composition, or the stabilizer composition with the filler, before the filler and the relatively high equivalent weight active hydrogen-containing compound are blended. In this manner, the components are most readily mixed and maximum stability obtained. Most preferably, the stabilizer composition is added to the relatively high equivalent weight active hydrogen-containing compound, followed by the addition of the filler. This permits the filler to be handled and stored in the most convenient manner and eliminates a separate blending step, which often requires different equipment and conditions than the blending of liquids such as the relatively high equivalent weight active hydrogen-containing compound. If more than one filler is used, it is preferred to mix them with the relatively high equivalent weight active hydrogen-containing compound as a blend, or if added separately, to first add the most incompatible filler, followed by the more compatible fillers.

In blending the filler, stabilizer and relatively high equivalent weight active hydrogen-containing compound, it is advantageous to heat the mixture to a temperature of about 40°–80° C. in order to thoroughly mix the components. This heating can be achieved in any convenient manner, and is conveniently achieved with the heat of shear generated in the mixing process.

The active hydrogen-containing composition of this invention may contain other components, both reactive and non-reactive. Examples of such components are chain extenders, blowing agents, catalysts, surfactants, mold release agents, preservatives, pigments, dyes, antioxidants and the like.

Suitable chain extenders include relatively low (preferably about 31 to about 200) equivalent weight materials having from about 2 to about 4, preferably about 2, active hydrogen-containing groups per molecule. The active hydrogen-containing groups are advantageously hydroxyl or amine groups. Preferred chain extenders include $\alpha, \omega$-alkylene glycols such as ethylene glycol, 1,3-propylene glycol, 1,4-butanediol; low equivalent weight glycol ethers such as diethylene glycol, triethylene glycol, dipropylene glycol, tripropylene glycol and the like; and aromatic diamines such as diethyltoluenediamine, methylene dianiline, methylene bis(o-chloroaniline), and the like. Preferred chain extenders include ethylene glycol, diethylene glycol, 1,4-butane diol, diethyltoluenediamine and mixtures thereof.

The chain extender is present in an amount from about 5 to about 65, preferably about 10 to about 50, more preferably about 10 to about 35, parts per 100 parts by weight of the relatively high equivalent weight active hydrogen-containing compound.

Suitable blowing agents, which are optionally employed herein, include water, halogenated methanes such as methylene chloride, dichlorodifluoromethane, trifluoromonochloromethane and the like, the so-called "azo" blowing agents, finely divided solids and the like. Preferred are water and the halogenated methanes, or mixtures thereof. Water, in an amount from about 0.1 to about 2 parts per 100 parts relatively high equivalent weight active hydrogen-containing compound, is most preferred. Alternatively, air, nitrogen or other gasses can be whipped into the composition in order to reduce the density of the polyurethane.

One preferred component is a catalyst for the reaction of the polyisocyanate with the various active hydrogen-containing materials in the active hydrogen-containing composition. Suitable catalysts include organometallic compounds and tertiary amine compounds. Of the organometallic catalysts, organotin catalysts such as dimethyltindilaurate, dibutyltindilaurate, stannous octoate and the like are preferred. Other useful organometallic catalysts are disclosed, for example, U S. Pat. No. 2,846,408, incorporated herein by reference. Suitable tertiary amine compounds include triethylenediamine, N-methyl morpholine, N-ethyl morpholine, diethylethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine and the like. Mixtures of tertiary amine and organotin catalysts are also useful. Advantageously, about 0.01 to about 0.5 parts by weight of an organometallic catalyst and/or about 0.05 to about 2 parts of a tertiary amine catalyst are used per 100 parts relatively high equivalent weight polyol.

In preparing a polyurethane according to this invention, the active hydrogen-containing composition is reacted with a polyisocyanate. Both aliphatic and aromatic diisocyanates are useful in this invention. Suitable aromatic diisocyanates include, for example, m-phenylene diisocyanate, p-phenylene diisocyanate, 2,4- and/or 2,6-toluene diisocyanate (TDI), naphthylene-1,5-diisocyanate, 1-methoxyphenyl-2,4-diisocyanate, 4,4'-biphenylenediisocyanate, 3,3'-dimethoxy-4,4'biphenyldiisocyanate, 2,4'- and/or 4,4'-diphenylmethanediisocyante (MDI) and derivatives thereof. Preferred, on the basis of cost and performance, among the aromatic polyisocyanates are the isomers and derivatives of TDI and MDI.

Exemplary aliphatic polyisocyanates include isophorone diisocyanate, cyclohexane diisocyanate, hydrogenated diphenylmethanediisocyanate ($H_{12}MDI$), 1,6-hexamethylenediisocyante and the like. Of these, hexamethylenediisocyanate and $H_{12}MDI$ are most preferred on the basis of cost and performance.

Biuret, urethane, urea, uretonimine and/or carbodiimide containing derivatives, including prepolymers, of the foregoing polyisocyanates are also suitable.

In preparing the polyurethane, the polyisocyanate is advantageously employed in an amount to provide about 0.9 to about 1.5, preferably about 1.0 to about 1.25, more preferably about 1.0 to about 1.15, isocyanate groups per active hydrogen-containing group present in the reaction mixture. Lesser amounts of polyisocyanate produce an inadequately cured polymer whereas greater amounts thereof tend to form undesirable crosslinking.

The polyurethane is advantageously prepared by mixing the active hydrogen-containing composition of this invention with the polyisocyanate under conditions such that reactive materials react to form a polymer. In preparing a molded polyurethane, the reactants are advantageously blended and transferred into a suitable mold where curing, at least to a point where the part maintains its shape during demolding, occurs. In preparing slabstock foams, the reactants are mixed, poured out on a line and permitted to freely rise under their own weight. In making polyurethane backed textiles, the reactants are applied to the surface of the textile and permitted to cure in place.

Curing conditions vary according to the particular reactants, the choice of catalyst, and the type of polyurethane product being made. Molded polyurethanes are often cured using heated molds, whereas slabstock foam is permitted to cure without the application of external heat. In making textile backing, the reactants are preferably maintained at about ambient temperature prior to application to the textile, and then cured in a suitable oven at a temperature from about 90° to about 185° C. for a period of about 3 to about 20 minutes. The conditions used in curing polyurethane polymers are well known in the art, and reference is made thereto for the purposes of this invention.

One especially important application of this invention is in polyurethane backed textiles. The polyurethane used in these textiles must exhibit a combination of tenacious bonding to the textile, low residual tack and high dimensional stability. In order to achieve this combination of features, the functionality and reactivity of the components must be carefully controlled. In addition, the composition of the reactants must be consistent over the period during which a portion of filler-containing polyol is used.

In order to achieve the required combination of properties, it has been found highly desirable to employ ethylene oxide-capped polyethers in the polyurethane backed textiles, as described in the copending application of Mobley, et al., Ser. No. 776,320, filed Sept. 16, 1985, now U.S. Pat. No. 4,696,849. Accordingly, it has heretofore been extremely difficult to provide a stable enough dispersion of the filler in the polyol. The practice of this invention provides a filler-containing polyol which is useful in making polyurethane backed textiles. A preferred active hydrogen-containing composition for use in preparing polyurethane backed textiles comprises (a) an ethylene-oxide capped polyether having an average functionality of about 1.95–2.02 and an equivalent weight from about 1000–2500, and, per 100 parts of component (a), (b) about 10–40 parts of an $\alpha\omega$-alkylene glycol or glycol ether, (c) about 40–250 parts of a particulate filler or mixture thereof, and (d) about 0.2 to about 2 parts of the stabilizer composition. Such composition is preferably reacted with a polyisocyanate having an average functionality of about 2.0 to about 2.2. Most preferably, this polyurethane is a unitary carpet backing formulation.

As stated before, the stabilizer composition employed in this invention substantially reduced the tendency of the filler to precipitate out of the polyol. In additon, it has a relatively small effect on the reactivity of the polyol with a polyisocyanate. Typically, the reactivity thereof is altered by less than about ±40%, preferably by ±30 percent or less, as measured according to the test described in Example 2 following.

The following examples are provided to illustrate the invention, and are not intended to limit the scope thereof. All parts and percentages are by weight unless otherwise indicated.

EXAMPLE 1

In a suitable container is placed a polyol mixture containing 75 parts of a 2000 molecular weight poly(propylene oxide) nominal diol which is end-capped with 12 weight percent ethylene oxide, 10 parts of 3000 molecular weight poly(propylene oxide) nominal triol which is end-capped with about 10 weight percent ethylene oxide, and 15 parts of dipropylene glycol. With agitation, 100 parts of alumina trihydrate is added, followed by the addition of 105 parts calcium carbonate. The mixture is then agitated until the mixture reaches a temperature of 50° C. The resulting filled polyol is designated Comparative Sample A.

In similar manner, 100 parts of the same polyol mixture are added to a container. To the mixture are added, sequentially, 0.4 part of oleoyl sarcosine and 0.2 part of sodium lauroyl sarcosine. After mixing these components, 100 parts of alumina trihydrate are blended in, followed by 105 parts of calcium carbonate. The resulting mixture is then agitated until its temperature reaches 50° C. The resulting filled polyol is designated Sample No. 1.

Comparative Sample A and Sample No. 1 are divided into several portions for testing. One portion of each is permitted to sit at room temperature for one day without agitation. After one day Sample No. 1 is still a free flowing liquid. Minimal settling of the filler occurs. However, Comparative Sample A contains a firmly packed settled layer of filler on the bottom. After two days, Comparative Sample A has separated into three phases, but Sample No. 1 shows little settling.

An agitation study is performed on Sample No. 1 and the Comparative Sample. A weighed portion of Sample No. 1 is placed into a 2000 ml resin kettle which is equipped with an air driven mixer. The mixer is operated at 75 rpm on a one hour on/one hour off schedule for 5 days. The kettle is then drained over a period of 24 hours to ensure that all flowable material is removed. After 5 days, only 2.2% of Sample No. 1 has settled out and does not flow out of the kettle. By contrast, when the Comparative Sample is tested in this manner, the stirrer becomes frozen due to the mass of precipitating filler. Only 24.3% of the filled polyol can be poured from the kettle.

EXAMPLE 2

The effects of stabilizers on the reactivity of polyether polyols and polyisocyanates are evaluated in this example. To a suitable beaker are added 100 parts of the polyol mixture described in Example 1. The stabilizer, if any, is added with stirring, followed by mixing at 2000 rpm for 30 seconds. Then, 100 g. of alumina trihydrate are added, followed by 105 g. of calcium carbonate. The contents of the beaker are then agitated until the temperature reaches 75° F. To the heated contents are added sufficient of an MDI prepolymer to provide a 110 index (1.1 equivalents of isocyanate per equivalent of hydroxyl groups), followed by agitation until the temperature of the mixture reaches 85° F. At this point a mixture of 0.98 g of a 2000 molecular weight poly(propylene oxide) diol, 0.02 g. of ferric acetylacetonate and 0.005 g of an organotin catalyst is added using a syringe, followed by 30 seconds additional mixing. The time required for the reacting mixture to reach a temperature of 120° F. is recorded as gel time, a measure of the reactivity of the components. The stabilizers used in this experiment are as indicated in Table 1 following. The results of the reactivity study are also indicated in Table 1.

TABLE 1

| Sample No. | SLS[1], parts | OS[2], parts | Gel Time, min. |
|---|---|---|---|
| B* | 0 | 0 | 2:20 |
| C* | 0 | 0.5 | 4:30 |

TABLE 1-continued

| Sample No. | SLS[1], parts | OS[2], parts | Gel Time, min. |
|---|---|---|---|
| D* | 0.5 | 0 | :30 |
| 2 | 0.2 | 0.3 | 1:57 |
| 3 | 0.2 | 0.4 | 2:20 |
| 4 | 0.2 | 0.5 | 3:00 |

[1] SLS is sodium lauroyl sarconsinate, added as a stabilizer as indicated.
[2] OS is oleoyl sarcosine, added as a stabilizer as indicated.

Comparative Sample B is a blank in which no stabilizer is used. Its gel time is therefore the standard to which the others are compared. In Comparative Sample C, the addition of a carboxylic acid alone almost doubles the gel time. In Comparative Sample D, use of the acid salt alone reduces the gel time dramatically. However, the use of mixtures of the free acid and the metal salt, as in Sample Nos. 2–4, cause acceptable, relatively small variations in gel time. Sample No. 3 in particular shows no change in gel time.

What is claimed is:

1. An active hydrogen-containing composition comprising
    an active hydrogen-containing material having an equivalent weight of from about 500 to about 5,000,
    (b) at least about 5 parts by weight of an inert, particulate filler per 100 parts by weight of component (a), and
    (c) a stabilizing amount of a stabilizer composition comprising
        (1) a carboxylic or phosphorus-containing acid containing about 8 to about 30 carbon atoms and
        (2) a metal salt of a carboxylic acid containing about 8 to about 30 carbon atoms.

2. The active hydrogen-containing composition of claim 1 wherein component (a) comprises a polyether polyol.

3. The active hydrogen-containing composition of claim 2 wherein about 0.1 to about 3 parts of the stabilizer composition are present per 100 parts of component (a).

4. The active hydrogen-containing composition of claim 3 wherein component (c) (1) comprises about 30 to about 70 weight percent of the combined weights of components (c) (1) and (c) (2).

5. The active hydrogen-containing composition of claim 3 wherein component (c) (1) comprises a fatty acid having from about 10 to about 22 carbon atoms.

6. The active hydrogen-containing composition of claim 3 wherein component (c) (1) comprises an amido-containing carboxylic acid which is the reaction product of a carboxylic acid halide containing from about 1–24 carbon atoms with an amino carboxylic acid having from about 2 to about 3 carbon atoms per molecule.

7. The active hydrogen-containing composition of claim 5 wherein component (c) (2) comprises an alkali metal salt of a fatty acid having from about 10 to about 22 carbon atoms.

8. The active hydrogen-containing composition of claim 5 wherein component (c) (2) comprises an alkali metal salt of an amido-containing carboxylic acid.

9. The active hydrogen-containing composition of claim 6 wherein component (c) (2) comprises an alkali metal salt of a fatty acid having from about 10 to about 22 carbon atoms.

10. The active hydrogen-containing composition of claim 6 wherein component (c) (2) comprises an alkali metal salt of an amido-containing carboxylic acid.

11. The active hydrogen-containing composition of claim 7, 8, 9, or 10 wherein component (a) comprises a di-or trifunctional polymer of propylene oxide containing about 10 to about 25 weight-% terminal ethylene oxide capping and having an equivalent weight from about 1000 to about 2500.

12. The active hydrogen-containing composition of claim 11 wherein component (b) comprises alumina trihydrate, calcium carbonate, or a mixture thereof.

13. A filled polyurethane which is the reaction product of a reaction mixture comprising a polyisocyanate and the active hydrogen-containing composition of claim 1.

14. A filled polyurethane which is the reaction product of a reaction mixture comprising a polyisocyanate and the active hydrogen-containing composition of claim 5.

15. A filled polyurethane which is the reaction product of a reaction mixture comprising a polyisocyanate and the active hydrogen-containing composition of claim 6.

16. A filled polyurethane which is the reaction product of a reaction mixture comprising a polyisocyanate and the active hydrogen-containing composition of claim 11.

* * * * *